Dec. 11, 1956    T. B. FARRINGTON ET AL    2,773,975
MOTOR DRIVEN LAMP HANGER
Original Filed March 19, 1948    4 Sheets-Sheet 1
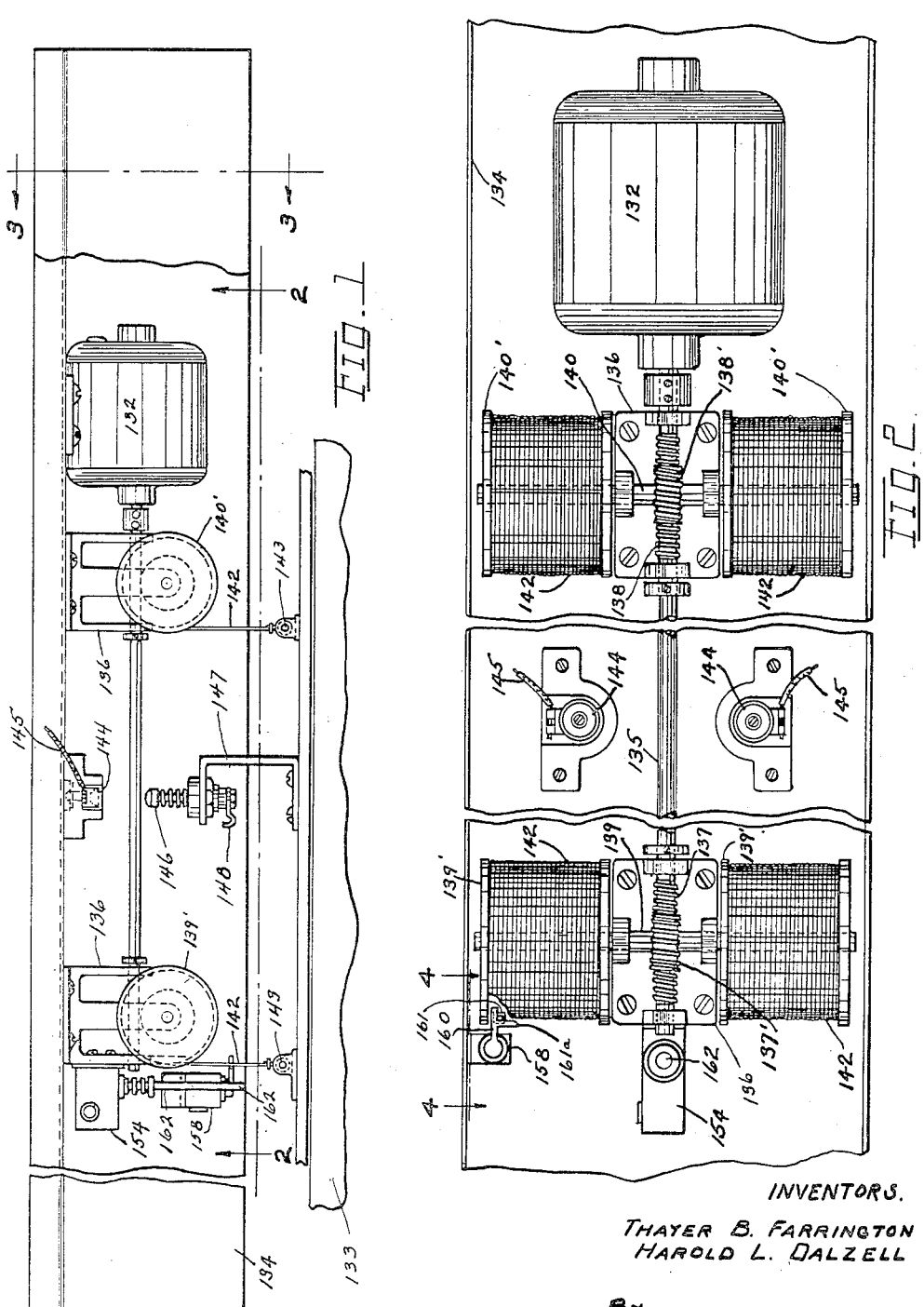
INVENTORS.
THAYER B. FARRINGTON
HAROLD L. DALZELL
BY
Hyde, Meyer, Baldwin & Doran
ATTORNEYS.

Dec. 11, 1956 T. B. FARRINGTON ET AL 2,773,975
MOTOR DRIVEN LAMP HANGER
Original Filed March 19, 1948 4 Sheets-Sheet 2
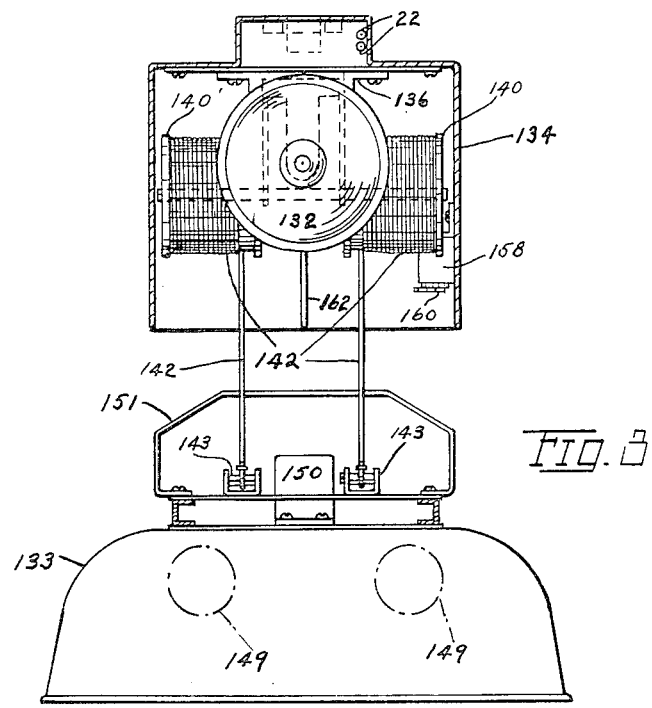
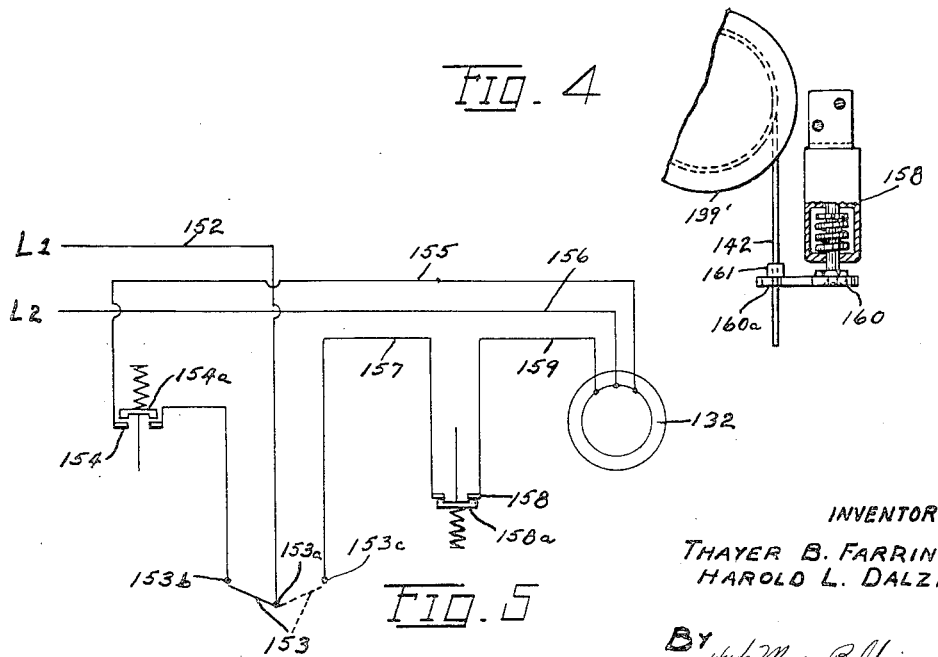
INVENTORS.
THAYER B. FARRINGTON
HAROLD L. DALZELL
BY Hyde, Meyer, Baldwin & Doran
ATTORNEYS.

Dec. 11, 1956     T. B. FARRINGTON ET AL     2,773,975
MOTOR DRIVEN LAMP HANGER
Original Filed March 19, 1948     4 Sheets-Sheet 3
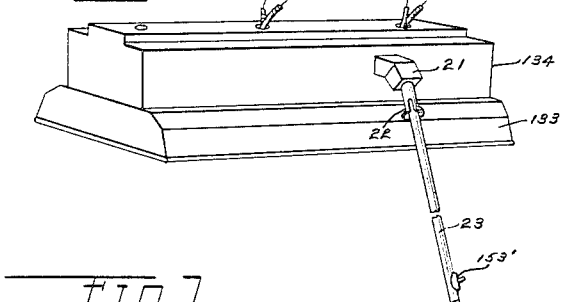
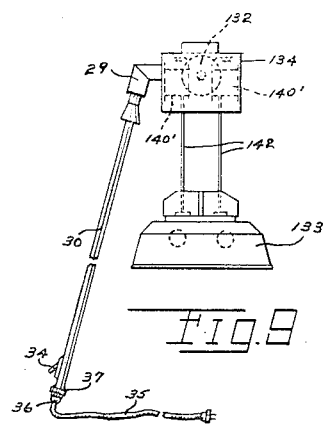
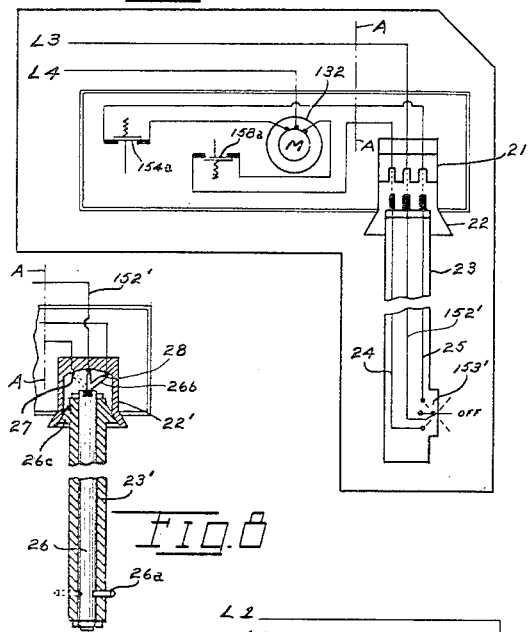
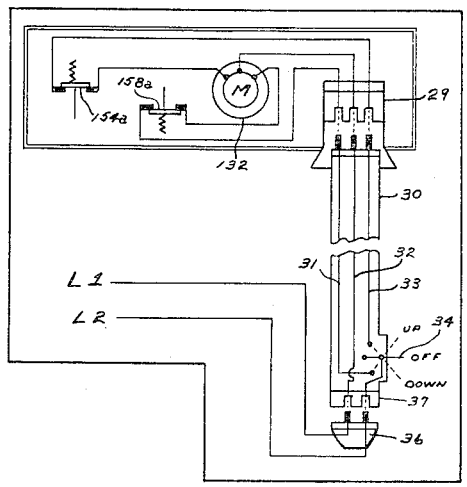
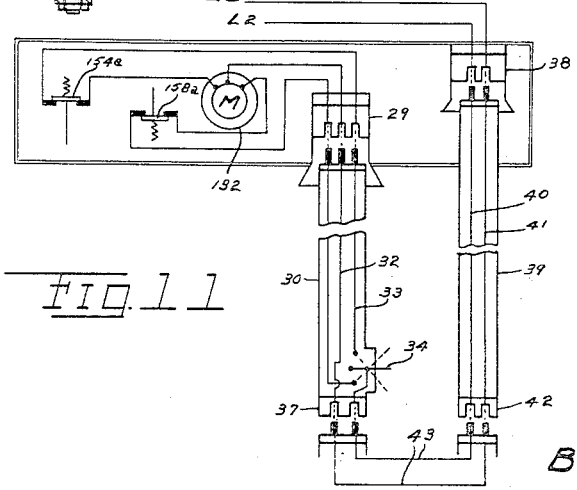
INVENTORS
THAYER B. FARRINGTON
HAROLD L. DALZELL
By Hyde, Meyer, Baldwin & Doran
ATTORNEYS Dec. 11, 1956 T. B. FARRINGTON ET AL 2,773,975
MOTOR DRIVEN LAMP HANGER
Original Filed March 19, 1948 4 Sheets-Sheet 4
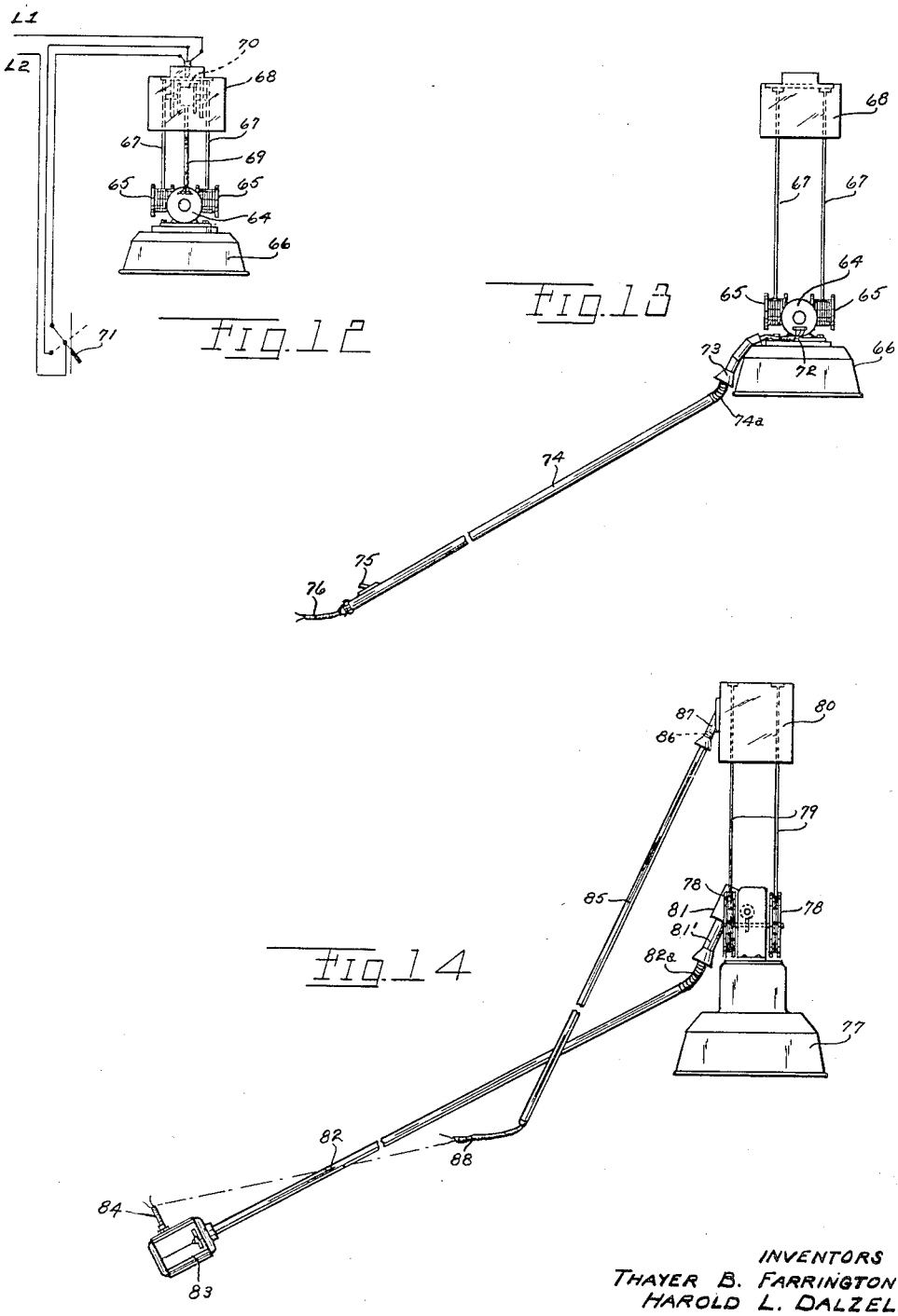
INVENTORS
THAYER B. FARRINGTON
HAROLD L. DALZELL
By Hyde, Meyer, Baldwin & Doran
ATTORNEYS

United States Patent Office 2,773,975
Patented Dec. 11, 1956

2,773,975

MOTOR DRIVEN LAMP HANGER

Thayer B. Farrington, Cleveland Heights, and Harold L. Dalzell, Cleveland, Ohio, assignors to The Thompson Electric Company, Cleveland, Ohio, a corporation of Ohio Original application March 19, 1948, Serial No. 15,794. Divided and this application October 5, 1951, Serial No. 249,882

11 Claims. (Cl. 240—66)

This invention relates to improvements in disconnecting and lowering lamp hanger structure.

An object of the present invention is to provide an improvement in the combination of a fixed hanger member in an elevated position and a lowering hanger member adapted to be raised and lowered therebeneath, said lowering member carrying a lamp. Our improvement provides power means in the form of an electrical motor for causing the raising and lowering action of the lowering hanger member.

One of the objects of the present invention is to provide a motor on the fixed hanger member for winding up flexible supports such as tapes or cables from which the lowering member is suspended. In one form of our invention the power for this motor is supplied from an external circuit with a control switch in a remote location as for instance, on the wall of the room. In another form of our invention the energizing circuit for the motor is on the fixed member itself, and may be part of a standard lighting circuit, and a long rod extends from the fixed member to the floor so that an operator, by inserting the rod in the fixed member may control the operation of the motor from the floor. In another form of our invention, a motor circuit is provided on the fixed member including a plug-in socket and the operator carries a rod having a circuit adapted to be plugged into the socket and in turn having an extension cord adapted to be plugged in at any suitable source of power.

Another object of our invention is to provide the operating motor on the lowering hanger member together with various means for controlling the power for energizing the motor. In one form of our invention flexible electrical conductors for energizing the motor extend from the lowering hanger member upwardly to a reel on the fixed hanger member and are there connected with an external electrical circuit which extends to a remote location where the control switch is located. In another form of this invention a rod carried by the operator on the floor is engaged in the fixed member in an elevated position to control the flow of current to the reel where it is connected to the flexible conductors extending downwardly to the lowering hanger member. In another form of our invention, a plug-in socket on the lowering hanger member is connected with a rod carried by the operator and this rod carries an electrical circuit adapted to be connected through a source of power by an extension cord. In still another form of our invention a plug-in rod brings power from the fixed hanger member downwardly where it is connected to the lower end of the second rod which in turn is plugged into a socket on the lowering hanger member to supply power to the motor.

Other objects and advantages of our invention will be apparent from the accompanying drawings and description and the essential features will be set forth in the appended claims.

In the drawings, Fig. 1 is a side elevational view of one form of our device where the electrical motor is mounted on the fixed hanger member and supplied with power from an external circuit. Parts of the view are broken away to more clearly show the construction;

Fig. 2 is an enlarged view of Fig. 1 taken along the line 2—2 thereof;

Fig. 3 is an end elevational view of the device of Figs. 1 and 2 taken along the line 3—3 of Fig. 1;

Fig. 4 is an enlarged fragmental view taken along the line 4—4 of Fig. 2 with a portion of the switch housing broken away to show the switch-closing spring;

Fig. 5 is a wiring diagram for the device shown in Figs. 1—4, inclusive;

Fig. 6 is a perspective view of a device like Figs. 1—4, but showing a rod extending downwardly to the floor for the purpose of controlling the electric circuit to the motor;

Figs. 7 and 8 are diagrammatic views showing two different ways for controlling the supply of electricity to the motor of Fig. 6.

Fig. 9 is an end elevational view of a device like Figs. 1 to 4, except that the power for operating the motor is supplied through a rod extending down to the floor and there connected with an extension cord;

Fig. 10 is a diagrammatic view showing the supply of power to the motor of Fig. 9;

Fig. 11 shows a modification of Figs. 9 and 10 wherein a slightly different means is provided for supplying power to the motor;

Fig. 12 is an end elevational view of a modified form of our device wherein the motor and the drum means for winding the flexible supports are mounted on the lowering hanger member. In this form of our device the power for the motor is supplied from an external circuit through a flexible conductor which is wound on a reel mounted in the fixed hanger member;

Fig. 13 is an end elevational view of a device like Fig. 12 wherein the drum means and the motor for operating the same are mounted on the lowering hanger member. In this form of our device the power for the motor is supplied through a flexible rod extending downwardly to an operator standing on the floor and connected to a suitable source of power;

Fig. 14 is an end elevational view of the device like Fig. 10 except that here the drum means for winding the flexible cables only is mounted on the lowering hanger member and the motor for operating this drum is at the lower end of a long rod which is provided at its upper end with clutch means for driving the drum means. Fig. 14 also illustrates how the power for this motor may be brought downwardly by means of a rod plugged into a connection on the fixed hanger member.

This application is a division of our copending application S. N. 15,794 filed March 19, 1948, now Patent No. 2,609,170, granted September 2, 1952.

One form of our device is shown in Figs. 1 to 5, inclusive, wherein an electric motor 132 is mounted on one of the separable members to drive cables connected to the other of the members so as to control the lowering and raising of the lamp hanger member. In Fig. 1, only a portion of the lowering member 133 is shown because this member is similar to that shown at 25 and 25' in the copending application of Thayer B. Farrington et al., Serial No. 589,822, filed April 23, 1945 for Overhead Mounting for Tubular Lighting Fixtures, now Patent No. 2,564,328, granted August 14, 1951. The upper fixture comprises a trough-like member 134 opening downwardly. Obviously, this trough-like form may be supported in its elevated position by any suitable means. Mounted in fixed position in the upper member 134 is the motor 132 which drives a shaft 135 mounted for rotation in suitable brackets 136. Worms 137 and 138 on this shaft mesh with worm wheels 137' and 138' respectively. Each of the worms rotates a shaft 139 and 140 respectively, these shafts also being rotatably mounted in the brackets 136. Shaft 139 carries drums 139' for rotation therewith. Likewise, the drums 140' rotate with shaft 140. Four cables 142 are wrapped on the four drums shown in such a direction that upon rotation of motor 132 in one direction all of the cables are wound on the drums, and upon rotation of the motor in the opposite direction, all of the cables are unwound from the drums. The free ends of the cables are connected to the lowering hanger member 133 by connection to the pins 143.

Located centrally of the upper fixture 134 are two fixed contacts 144 suitably insulated as shown and connected by conductors 145 with a source of electric power not shown. Mating contacts 146 adapted to register with the contacts 144 are resiliently mounted on the lower member 133 by means of the brackets 147 as shown in Fig. 1. Electrical connections (not shown) are secured between the binding posts 148 and the lamps 149 which are detachably mounted on the lower fixture. The details of the lowering member need not be described here but include the usual reflector, and, in the case of the tubular lamps, may carry the ballast 150, suitable starters for the lamp, etc., where such electrical apparatus is necessary. The means 151 is shown for positioning the lowering hanger member with respect to the trough 134 to insure that the lowering member enters into the upper trough. This also insures that the contacts 146 and 144 are in registration before they engage.

Suitable electrical wiring for the device of Figs. 1, 2, and 3 is indicated diagrammatically in Fig. 5. The motor 132 is a single phase reversible motor supplied from the electrical lines $L_1$, $L_2$. The line $L_1$ is connected by line 152 to the central contact 153a of a single pole double-throw switch 153 which may be mounted on a wall of the room or any other station accessible to the operator. In one position of the switch, it connects the contact 153a with contact 153b which leads through limit switch 154 and line 155 to motor 132 and thence through a winding of that motor to line 156 and back to the source $L_2$. This winding operates motor 132 in a direction to raise the lowering hanger member 133. In another position of switch 153, it joins contact 153a with contact 153c, the latter leading through line 157 and limit switch 158 to line 159 and another tap on motor 132. This winding of the motor is connected with line 156 and back to the source $L_2$. This last named winding serves to drive motor 132 in the opposite direction to the first described winding, namely in a direction to lower the member 133.

The limit switches 154 and 158 are provided so that the operator may throw the switch 153 in the desired direction and thereafter the member 133 will be driven to a limit position where the motor will be automatically deenergized.

Referring first to limit switch 158, this may be mounted on the bracket 136 and provided with an arm actuator 160 having its head 160a located adjacent one of the last turns of cable 142 on one of the drums 139' as best seen in Figs. 2 and 4. A block or button 161 suitably positioned on the cable 142 moves downwardly when sufficient cable has been unwound from the drum and engages the head 160a so as to actuate switch 158 and open the contacts 158a thus opening the circuit described above and stopping the downward movement of the member 133. Even if there is more cable on the drums, the member 133 will stay in this position where it is stopped by the limit switch, that is to say, gravity will not pull the member 133 farther downward because the worm and worm wheel drive 137, 137' prevents such action.

When the switch 154 has been thrown into the position engaging contact 153b to cause upward movement of the member 133, this action will continue until limit switch 154 opens the circuit. It will be noted in Figs. 1 and 2 that limit switch 154 is mounted on bracket 136 and has an actuating stem 162 depending downwardly in position to be engaged by a top portion of member 133 just as the reflector engages the bottom of the trough-like member 134. At that moment, the stem 162 is moved up slightly disengaging the switch contacts 154a and opening the circuit to stop the upward movement of member 133. Here again the worm and worm wheel drive holds the member 133 in elevated position against the action of gravity.

It will be noted that both switches 154 and 158 are normally closed, that is to say, spring means is provided as shown to close these switches once the actuator 160 or 162 has been released so that these switches are always set for another operation.

In Figs. 6 and 9 are shown devices exactly like Figs. 1, 2 and 3 insofar as the motor and the drums for winding up the flexible supports 142 are concerned. Here the motor 132 is mounted on the fixed hanger member as before, but the means for energizing this motor is different. In Fig. 6 the energizing circuit for motor 132 is connected with the source $L_3$, $L_4$ as diagrammatically shown in Fig. 7. This motor circuit is brought out to a plug-in socket 21 on the side of the hood 134. A guide 22 fixed in position on the upper hanger member serves to guide a rod 23 into electrical connection with the socket 21. This rod 23 is long enough to extend from the elevated fixed hanger member to the operator standing on the floor below.

The diagrammatic view of the electrical circuit for operating the motor 132 in the device of Fig. 6 is shown in Fig. 7. In general the operating circuits for the motor 132 are like that shown in Fig. 5 and the limit switches 154a and 158a perform the same functions as described in connection with Fig. 5. Inside the rod 23 are electrical lines 24, 25, and 152' having prongs at their upper ends to connect with the socket 21. The line 152' is analogous to the line 152 of Fig. 5, and leads to a switch 153' which is analogous to a switch 153 of Fig. 5. This switch in either of its broken line positions of Fig. 7 will connect line 152' either with line 24 or with line 25. In one of its positions the switch causes the motor 132 to operate to wind up the flexible connectors 142 and in its other connection the switch causes the motor to turn in the opposite direction to unwind the flexible connectors 142.

In Fig. 8 there is shown a rod 23' which performs much the same function as the rod 23 in Fig. 6. Here, however, the rod 23' provides mechanical means for controlling the electrical circuit for the motor 132, whereas the device of Fig. 7 shows electrical means in the rod 23 for the purposes. Referring again to Fig. 8, the rod 23' houses an oscillatable shaft 26 which carries a handle 26a at its lower end extending out through the rod for operation by a person standing on the floor. At the upper end of shaft 26 is mounted a switch 26b having two arms so spaced that in one position as shown in full lines in Fig. 8 the switch will connect line 152' with the contact 28 to operate motor 132 in one direction. In the broken line position of Fig. 8 the switch 26b will connect line 152' with contact 27 so as to operate the motor 132 in the opposite direction. The diagram of Fig. 8 is intended to include at the left of the line A—A all of the diagram of Fig. 7 to the left of the line A—A indicated there. Preferably means is provided on rod 23' such as the shoulder 26c engaging the flaring end of the guide 22' so as to limit the upward motion of the rod 23' when the switch 26b is in proper position.

In the form of our device shown in Figs. 9 and 10, the construction is exactly the same as that described in connection with Figs. 6, 7 and 8 except that the motor 132 is now provided with a circuit in the fixed hanger member which runs to a plug-in socket 29 quite analogous to the socket 21 described in connection with Fig. 7. Here a rod 30 is provided adapted to plug in to the socket 29 at the upper end of the rod, which, of course, extends downwardly to the floor. The rod 30 carries electrical lines 31, 32, and 33 which are connected through switch 34 at the lower end of the rod for the purposes of reversing motor 132. The difference here is in the manner of supplying the power to the motor. The source $L_1, L_2$ is connected through an extension cord 35 and a pronged connection 36 with a receptable 37 on the lower end of rod 30.

The devices of Figs. 1 to 5 are for very high mountings or for very heavy fixtures or for installations where appearance is important. It should be obvious that the devices shown in Figs. 7 to 10 have this advantage over the devices shown in Figs. 1 to 5, inclusive, that the operator need not walk back and forth to a switch 153 in a remote location, but instead he carries the rod 23 or the rod 30 with him and may operate the raising and lowering apparatus while standing beneath the lighting fixture. In the case of rod 23 he merely has to operate the switch 153′ or the handle 26a in the case of Fig. 8. In the forms shown in Figs. 9 and 10 he has to plug in the extension cord 35 and thereafter operates the switch 34.

The modification in Fig. 11 is another manner of supplying current to the rod 30 whether or not the extension cord is used. In this case the extension cord may be done away with by providing a fixed socket 38 on the fixed or elevated hanger member. A rod 39 is provided with two electrical conductors 40 and 41 extending to pronged connections at the upper end adapted to plug into the socket 38. At its lower end, the rod 39 is provided with a receptacle 42 connected with the lines 40 and 41, an extension cord 43 may then be plugged into the receptacle 42 at one end and into the receptacle 37 at the bottom of the rod 30 at the other end and thus supply current to the motor 132 in Fig. 11 in much the same manner that motor 132 was supplied in Fig. 10. Obviously, rods 30 and 39 of Fig. 11 might be combined into a single rod with five prongs.

The plugs 21, 28, 29 and 38 might be placed at the end of the elevated member or in the ceiling.

Our device is equally adaptable to the mounting of the driving motor on the lowering hanger member. Such modifications are shown in Figs. 12 and 13.

In Fig. 12 a motor 64 and four drums 65 are mounted on the lowering hanger member 66 and these parts are arranged exactly like the motor 132 and the drums 139′ and 140′ shown in Figs. 1 and 2. They are also provided with a common drive shaft analogous to 135 of Figs. 1 and 2. The lowering hanger member is supported by flexible cables or tapes 67 which are wound on the drums 65 and extend upwardly to a fixed connection in the hood 68 which in turn is located near the ceiling as in previously described forms of our device. It will be understood that the various devices for mounting a lamp in the member 66 and for energizing the same are provided in the usual manner and it is unnecessary to describe the details here.

In the form of device shown in Fig. 12 the means provided for energizing the motor 64 comprises flexible electrical conductors in the cable or conduit 69 which is suitably connected with the motor circuit at the lower end. This conduit 69 is flexible and extends upwardly where it is wound over a spring take-up reel 70 rotatably mounted in suitable brackets connected with the upper fixture 68. By electrical brushes not shown but well known in this art the electrical conductors in the cable or conduit 69 are connected where they leave the reel 70 with a suitable source of electric power for operating the motor 64 in opposite directions. This operating circuit is connected with the source of $L_1, L_2$ and by means of a switch 71 the direction of rotation of the motor 64 may be controlled. The operation of Fig. 12 is similar to that described in Figs. 1 to 5 where the switch 71 is located at any conveneint spot perhaps upon the wall of the room where the light fixture is located. By operating the switch 71 the motor 64 may be controlled to lower or raise the lamp whenever desired.

In Fig. 13 a modified form of device is shown wherein the motor 64, and the drums 65 are mounted on the lowering hanger member 66 as shown in Fig. 12. This lowering member is suspended by means of the flexible tapes or cables 67 extending upwardly to the fixed member 68. The difference in Fig. 13 is in the manner of supplying power to the motor 64. Here a short electrical circuit 72 for motor 65 extends to a plug-in socket 73 in fixed position on the side of the lowering hanger member 66. A rod 74 is then provided of sufficient length to extend to the floor when the hanger member is in its raised and operative position. This rod 74 is provided with circuits like those shown in rod 23 previously described and operable by means of a switch 75 mounted on the lower end of the rod. The power source is connected to the lines 76 which extend to any suitable source of electric power. Since the lowering member 66 changes its position as it approaches the floor it is perferable and desirable to provide the rod 74 with a very short flexible portion 74a as indicated in Fig. 13 so that it may bend as the lowering hanger member comes down.

Obviously in Figs. 12 and 13 the power might be provided by an extra rod plugged into an overhead plug. In Fig. 12 circuits may be provided exactly like those of Fig. 11 to bring power down from an overhead plug 38 and send it back up to conductor cable 69 connected to a plug like 29. In Fig. 13, a rod like 39 of Fig. 11 could be plugged into a fixed socket 38 in the overhead fixture (or in the ceiling). Wires 43 would then be connected to wire 76.

Also in Fig. 12, the control circuits for motor 64 might be located in the fixed hanger member and connected with the conductors in cable 69. Then such a circuit might be controlled by a rod extending to the floor like rod 23 of Fig. 7 or rod 23′ of Fig. 8.

In all of the modifications it is contemplated that when elongated fluorescent lighting tubes are provided, they will be accompanied by suitable ballast, starters, sockets and standard wiring circuits necessary for such equipment.

What we claim is:

1. In lighting apparatus comprising a fixed member in an elevated position above a floor and a lowering member adapted to occupy a raised operative position in juxtaposition with said fixed member or to occupy a position lowered therebelow, and wherein a lamp is carried by said lowering member, the combination of flexible supports connected between said fixed and lowering members, means including an electric motor on said fixed member for winding and unwinding said flexible supports respectively as said lowering member is raised and lowered, and means for energizing said motor including a circuit on said fixed member having a plug-in socket, and a stiff rod reaching from said fixed member to the floor and an electrical circuit in said rod including contacts insertable in said socket, and a control switch in said last named circuit near the lower end of said rod.

2. In lighting apparatus comprising a fixed member in an elevated position above a floor and a lowering member adapted to occupy a raised operative position in juxtaposition with said fixed member or to occupy a position lowered therebelow, and wherein a lamp is carried by said lowering member, the combination of flexible supports connected between said fixed and lowering members, means including an electric motor on said fixed member for winding and unwinding said flexible supports respectively as said lowering member is raised and lowered, and means for energizing said motor including an energizing circuit on said fixed member for said motor and including a control switch, a rod adapted to reach from said switch on said fixed member to the floor, and means on the lower end of said rod for operating said switch.

3. In lighting apparatus comprising a fixed member in an elevated position above a floor and a lowering member adapted to occupy a raised operative position in juxtaposition with said fixed member or to occupy a position lowered therebelow, and wherein a lamp is carried by said lowering member, the combination of flexible supports connected between said fixed and lowering members, means including an electric motor on said fixed member for winding and unwinding said flexible supports respectively as said lowering member is raised and lowered, and means for energizing said motor including a circuit on said fixed member including a plug-in socket, a stiff rod adapted to reach from said socket to the floor having an electrical circuit adapted to be plugged into said socket, an electrical cord adapted to be connected between said last named electrical circuit and an external energizing circuit, and a control switch adjacent said rod for said last named circuit.

4. In lighting apparatus comprising a fixed member in an elevated position above a floor and a lowering member adapted to occupy a raised operative position in juxtaposition with said fixed member or to occupy a position lowered therebelow, and wherein a lamp is carried by said lowering member, the combination of flexible supports connected between said fixed and lowering members, means including an electric motor on said lowering member for winding and unwinding said flexible supports respectively as said lowering member is raised and lowered, and means for energizing said motor including a circuit on said lowering member including a plug-in socket, a rod adapted to reach from said socket to the floor when said lowering member is in raised position, said rod having an electrical circuit adapted to be plugged into said socket, an electrical cord adapted to be connected between said last named circuit and an external energizing circuit, and a control switch adjacent said rod for said last named circuit.

5. In lighting apparatus comprising a fixed member in an elevated position above a floor and a lowering member adapted to occupy a raised operative position in juxtaposition with said fixed member or to occupy a position lowered therebelow, and wherein a lamp is carried by said lowering member, the combination of flexible supports connected between said fixed and lowering members, means including an electric motor on said fixed member for winding and unwinding said flexible supports respectively as said lowering member is raised and lowered, and means for energizing said motor including a circuit on said fixed member including a plug-in socket, a rod adapted to reach from said fixed member to the floor and having an electrical circuit throughout its length and connectable at the upper end of said rod with said socket, a second rod having an electrical circuit throughout its length, an energizing circuit on said fixed member, means for connecting said energizing circuit to said circuit in said second rod at its upper end, and means for connecting said circuits of said two rods at their lower ends.

6. In lighting apparatus comprising a fixed member in an elevated position above a floor and a lowering member adapted to occupy a raised operative position in juxtaposition with said fixed member or to occupy a position lowered therebelow, and wherein a lamp is carried by said lowering member with coacting contacts on said member engaged when said lowering member is in raised position to energize said lamp, the combination of flexible supports connected between said fixed and lowering members, means including an electric motor on said fixed member for winding and unwinding said flexible supports respectively as said lowering member is raised and lowered, said fixed member including a canopy having top and side walls and being open at its lower side only over substantially the entire area between said side walls, said lowering member including means adapted when raised to substantially completely close said open lower side of said canopy with said motor and flexible supports then lying within said closed canopy, whereby said fixed and lowering members coact to house said motor and flexible supports when said lowering member is in raised operative position, and means for energizing said motor including a circuit on said fixed member including a plug-in socket, a stiff rod adapted to reach from said socket to the floor having an electrical circuit adapted to be plugged into said socket, an electrical cord adapted to be connected between said last named electrical circuit and an external energizing circuit, and a control switch adjacent said rod for said last named circuit.

7. In lighting apparatus comprising a fixed member in an elevated position above a floor and a lowering member adapted to occupy a raised operative position in juxtaposition with said fixed member or to occupy a position lowered therebelow, and wherein a lamp is carried by said lowering member with coacting contacts on said member engaged when said lowering member is in raised position to energize said lamp, the combination of flexible supports connected between said fixed and lowering members, means including an electric motor on one of said members for winding and unwinding said flexible supports respectively as said lowering member is raised and lowered, said fixed member including a canopy having top and side walls and being open at its lower side only over substantially the entire area between said side walls, said lowering member including means adapted when raised to substantially completely close said open lower side of said canopy with said motor and flexible supports then lying within said closed canopy, whereby said fixed and lowering members coact to house said motor and flexible supports when said lowering member is in raised operative position, and means for energizing said motor including a circuit on said motor-carrying member including a plug-in socket, a stiff rod adapted to reach from said socket to the floor when said lamp is in raised operative position and having an electrical circuit adapted to be plugged into said socket, an electrical cord adapted to be connected between said last named electrical circuit and an external energizing circuit, and a control switch adjacent said rod for said last named circuit.

8. In lighting apparatus comprising a fixed member in an elevated position above a floor and a lowering member adapted to occupy a raised operative position in juxtaposition with said fixed member or to occupy a position lowered therebelow, and wherein a lamp is carried by said lowering member with coacting contacts on said members engaged when said lowering member is in raised position to energize said lamp, the combination of flexible supports connected between said fixed and lowering members, means including an electric motor on one of said members for winding and unwinding said flexible supports respectively as said lowering member is raised and lowered, said fixed member including a canopy having top and side walls and being open at its lower side only over substantially the entire area between said side walls, said lowering member including means adapted when raised to substantially completely close said open lower side of said canopy with said motor and flexible supports then lying within said closed canopy, whereby said fixed and lowering members coact to house said motor and flexible supports when said lowering member is in raised operative position, a stiff rod having a detachable connection with said motor-carrying member, said rod being of a length to reach from an operator on the floor to said motor-carrying member when said lamp is in raised operative position, and means for energizing said motor including said rod.

9. The combination of claim 8 wherein said last-named means includes an electrical circuit extending substantially the length of said rod.

10. The combination of claim 8 wherein said last-named means includes a switch on said motor-carrying member having an operative connection for operation by said rod.

11. In lighting apparatus comprising a fixed member in an elevated position above a floor and a lowering member adapted to occupy a raised operative position in juxtaposition with said fixed member or to occupy a position lowered therebelow, and wherein a lamp is carried by said lowering member with coacting contacts on said member engaged when said lowering member is in raised position to energize said lamp, the combination of flexible supports connected between said fixed and lowering members, means including an electric motor on one of said members for winding and unwinding said flexible supports respectively as said lowering member is raised and lowered, said fixed member including a canopy having top and side walls and being open at its lower side only over substantially the entire area between said side walls, said lowering member including means adapted when raised to substantially completely close said open lower side of said canopy with said motor and flexible supports then lying within said closed canopy, whereby said fixed and lowering members coact to house said motor and flexible supports when said lowering member is in raised operative position, and means for energizing said motor including a circuit on one of said members and electrically connected with said motor and including a plug-in socket, a stiff rod adapted to reach from said socket to the floor when said lamp is in raised operative position and having an electrical circuit adapted to be plugged into said socket, an energizing electrical circuit connected with said last named electrical circuit, and a control switch adjacent said rod for said last named circuit.

References Cited in the file of this patent

UNITED STATES PATENTS

| | | |
|---|---|---|
| 261,262 | Seymour | July 18, 1882 |
| 558,993 | Snowden | Apr. 28, 1896 |
| 1,631,488 | Jones | June 7, 1927 |
| 2,039,870 | Adams | May 5, 1936 |
| 2,360,713 | Parker | Oct. 17, 1944 |
| 2,391,936 | Wilson | Jan. 1, 1946 |
| 2,534,726 | Moore | Dec. 19, 1950 |
| 2,564,328 | Farrington | Aug. 14, 1951 |